US008249873B2

(12) United States Patent
Blair et al.

(10) Patent No.: US 8,249,873 B2

(45) Date of Patent: Aug. 21, 2012

(54) TONAL CORRECTION OF SPEECH

(75) Inventors: Colin Blair, Westleigh (AU); Kevin Chan, Ryde (AU); Christopher R. Gentle, Gladesville (AU); Neil Hepworth, Artarmon (AU); Andrew W. Lang, Epping (AU); Paul R. Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 905 days.

(21) Appl. No.: 11/203,463

(22) Filed: Aug. 12, 2005

(65) Prior Publication Data

US 2007/0038452 A1 Feb. 15, 2007

(51) Int. Cl.

| | |
|---|---|
| ***G10L 15/04*** | (2006.01) |
| ***G10L 15/28*** | (2006.01) |
| ***G10L 15/00*** | (2006.01) |
| ***G10L 19/14*** | (2006.01) |
| ***G10L 15/26*** | (2006.01) |
| ***G10L 15/06*** | (2006.01) |
| ***G10L 13/08*** | (2006.01) |
| ***G10L 11/00*** | (2006.01) |

(52) U.S. Cl. ........ 704/252; 704/254; 704/255; 704/257; 704/251; 704/231; 704/234; 704/235; 704/243; 704/260; 704/261; 704/270; 704/270.1; 704/275; 704/276; 704/277

(58) Field of Classification Search .................. 704/234, 704/255, 207, 257, 277, 270.1, 251, 260, 704/235, 243, 270, 276, 208, 4, 254, 231, 704/261; 381/56

See application file for complete search history.

(56) References Cited

U.S. PATENT DOCUMENTS

| | | | | |
|---|---|---|---|---|
| 4,473,904 A | | 9/1984 | Suehiro et al. | |
| 5,224,040 A | | 6/1993 | Tou | |
| 5,258,909 A | * | 11/1993 | Damerau et al. | 715/257 |
| 5,393,236 A | * | 2/1995 | Blackmer et al. | 434/169 |
| 5,561,736 A | | 10/1996 | Moore et al. | |
| 5,586,198 A | | 12/1996 | Lakritz | |
| 5,602,960 A | * | 2/1997 | Hon et al. | 704/207 |
| 5,632,002 A | * | 5/1997 | Hashimoto et al. | 704/231 |
| 5,636,325 A | | 6/1997 | Farrett | |
| 5,734,923 A | | 3/1998 | Sagawa et al. | |
| 5,750,912 A | | 5/1998 | Matsumoto | |

(Continued)

FOREIGN PATENT DOCUMENTS

CN 1371042 9/2002

(Continued)

OTHER PUBLICATIONS

Fu, Stephen W. K., Lee, C. H., Clubb, Orville L., "A Survey on Chinese Speech Recognition", Department of Computer Science, City University of Hong Kong, Nov. 23, 1995.*

(Continued)

*Primary Examiner* — Douglas Godbold
*Assistant Examiner* — Edgar Guerra-Erazo
(74) *Attorney, Agent, or Firm* — Sheridan Ross P.C.

(57) ABSTRACT

Tonal correction of speech is provided. Received speech is analyzed and compared to a table of commonly mispronounced phrases. These phrases are mapped to the phrase likely intended by the speaker. The phrase determines to be the phrase the user likely intended can be suggested to the user. If the user approves of the suggestion, tonal correction can be applied to the speech before that speech is delivered to a recipient.

24 Claims, 4 Drawing Sheets

RECEIVE SPEECH FROM USER, STORE RECEIVED SPEECH — 300
RECOGNIZE RECEIVED SPEECH — 304
SCAN DATABASE FOR COMMONLY MISPRONOUNCED PHRASES — 308
RECEIVED SPEECH CORRESPONDS TO COMMONLY MISPRONOUNCED PHRASE? — 312 (NO / YES)
ALERT USER OF POSSIBLE MISPRONUNCIATION, PROVIDE SUGGESTED SUBSTITUTE — 316
USER APPROVES OF SUGGESTED SUBSTITUTE? — 320 (NO / YES)
APPLY TONAL CORRECTION — 324
SEND SPEECH TO RECIPIENT ADDRESS — 328
END

U.S. PATENT DOCUMENTS 5,761,687 A * 6/1998 Hon et al. .................... 715/271
5,812,863 A 9/1998 Ishikawa
5,911,129 A 6/1999 Towell
5,987,413 A 11/1999 Dutoit et al.
5,995,932 A * 11/1999 Houde .......................... 704/261
5,995,934 A * 11/1999 Tang ............................ 704/270
6,005,498 A 12/1999 Yang et al.
6,014,615 A 1/2000 Chen
6,035,269 A * 3/2000 Kim ................................ 704/9
6,081,780 A * 6/2000 Lumelsky ..................... 704/260
6,115,684 A 9/2000 Kawahara et al.
6,125,341 A 9/2000 Raud et al.
6,148,024 A 11/2000 Ho et al.
6,185,535 B1 2/2001 Hedin et al.
6,188,983 B1 * 2/2001 Hanson ......................... 704/260
6,192,344 B1 * 2/2001 Lee et al. ...................... 704/277
6,249,763 B1 * 6/2001 Minematsu ................... 704/252
6,260,015 B1 * 7/2001 Wang et al. ................... 704/257
6,263,202 B1 7/2001 Kato et al.
6,272,464 B1 * 8/2001 Kiraz et al. ................... 704/257
6,374,224 B1 4/2002 Horiguchi et al.
6,470,316 B1 10/2002 Chihara
6,491,525 B1 12/2002 Hersh
6,513,005 B1 * 1/2003 Qin et al. ...................... 704/254
6,553,342 B1 * 4/2003 Zhang et al. .................. 704/255
6,564,213 B1 5/2003 Ortega et al.
6,598,021 B1 7/2003 Shambaugh et al.
6,686,907 B2 2/2004 Su et al.
6,697,457 B2 2/2004 Petrushin
6,775,651 B1 * 8/2004 Lewis et al. ................... 704/235
6,801,659 B1 10/2004 O'Dell
6,810,378 B2 10/2004 Kochanski et al.
6,853,971 B2 2/2005 Taylor
6,879,951 B1 * 4/2005 Kuo ............................... 704/10
6,950,799 B2 9/2005 Bi et al.
6,963,841 B2 * 11/2005 Handal et al. ................. 704/270
7,003,463 B1 * 2/2006 Maes et al. ................. 704/270.1
7,010,490 B2 3/2006 Brocious et al.
7,016,841 B2 3/2006 Kenmochi et al.
7,058,626 B1 6/2006 Pan et al.
7,085,716 B1 * 8/2006 Even et al. .................... 704/235
7,088,861 B2 8/2006 van Meurs
RE39,326 E 10/2006 Comer et al.
7,124,082 B2 10/2006 Freedman
7,149,970 B1 12/2006 Pratley et al.
7,155,391 B2 12/2006 Taylor
7,165,019 B1 * 1/2007 Lee et al. .......................... 704/2
7,181,391 B1 * 2/2007 Jia et al. ........................ 704/231
7,181,396 B2 * 2/2007 Emonts et al. ................ 704/251
7,257,528 B1 8/2007 Ritchie et al.
7,280,964 B2 * 10/2007 Wilson et al. ................. 704/251
7,292,980 B1 11/2007 August et al.
7,353,173 B2 * 4/2008 Menendez-Pidal et al. .. 704/254
7,363,224 B2 4/2008 Huang et al.
7,376,648 B2 5/2008 Johnson
7,380,203 B2 * 5/2008 Keely et al. ................... 715/230
7,398,215 B2 7/2008 Mesbah et al.
7,412,390 B2 8/2008 Kobayashi et al.
7,415,411 B2 * 8/2008 Reinhard et al. .............. 704/257
7,424,156 B2 9/2008 Huang
7,437,287 B2 10/2008 Kim
7,466,859 B2 12/2008 Chang et al.
7,478,047 B2 1/2009 Loyall et al.
7,533,023 B2 5/2009 Veprek et al.
7,593,849 B2 9/2009 Das et al.
7,684,987 B2 * 3/2010 Chu et al. ...................... 704/254
2002/0049594 A1 4/2002 Moore et al.
2002/0110248 A1 * 8/2002 Kovales et al. ................. 381/56
2002/0111794 A1 8/2002 Yamamoto et al.
2002/0111805 A1 * 8/2002 Goronzy et al. .............. 704/250
2002/0128820 A1 * 9/2002 Goronzy et al. ................ 704/10
2002/0128827 A1 9/2002 Bu et al.
2002/0128842 A1 * 9/2002 Hoi et al. ...................... 704/260
2002/0133523 A1 9/2002 Ambler et al.
2002/0138479 A1 9/2002 Bates et al.
2002/0152075 A1 10/2002 Kung et al.
2002/0184009 A1 12/2002 Heikkinen
2003/0023426 A1 1/2003 Pun et al.
2003/0054830 A1 3/2003 Williams et al.
2003/0107555 A1 6/2003 Williams
2003/0144830 A1 7/2003 Williams
2003/0212555 A1 11/2003 van Santen
2003/0216912 A1 * 11/2003 Chino .......................... 704/231
2003/0229497 A1 * 12/2003 Wilson et al. ............. 704/270.1
2004/0006461 A1 * 1/2004 Gupta et al. .................. 704/200
2004/0059580 A1 3/2004 Michelson et al.
2004/0148161 A1 * 7/2004 Das et al. ...................... 704/224
2004/0153306 A1 * 8/2004 Tanner et al. ..................... 704/4
2004/0193398 A1 * 9/2004 Chu et al. .......................... 704/3
2004/0267538 A1 * 12/2004 Obuchi et al. ................ 704/277
2005/0071165 A1 3/2005 Hofstader et al.
2005/0114194 A1 5/2005 Pandit
2005/0119899 A1 * 6/2005 Palmquist ..................... 704/277
2005/0144010 A1 * 6/2005 Peng ............................ 704/277
2005/0159954 A1 * 7/2005 Chu et al. ...................... 704/254
2006/0015340 A1 * 1/2006 Feng ............................ 704/254
2006/0122840 A1 6/2006 Anderson et al.
2006/0123338 A1 6/2006 McCaffrey et al.
2006/0149558 A1 7/2006 Kahn et al.
2006/0173685 A1 * 8/2006 Huang et al. .................. 704/254
2006/0256139 A1 11/2006 Gikandi
2006/0285654 A1 12/2006 Nesvadba et al.
2006/0293890 A1 12/2006 Blair et al.
2006/0294462 A1 12/2006 Blair et al.
2007/0005363 A1 1/2007 Cucerzan et al.
2007/0050188 A1 * 3/2007 Blair et al. .................... 704/207

FOREIGN PATENT DOCUMENTS

DE 10207875 8/2003
DE 10302754 7/2004
JP H08-083092 3/1996
JP H10-083195 3/1998
JP 10-294714 11/1998
JP 2002-189490 7/2002
JP 2005-92856 4/2005
TW 260772 * 4/1994
TW 369639 9/1999
TW 575867 2/2004
TW 200501053 1/2005
TW I226011 1/2005
TW 200506814 2/2005
TW 229844 3/2005
TW 200509065 3/2005
WO WO 01/03123 1/2001
WO WO 01/39179 5/2001
WO WO 2005/024779 3/2005

OTHER PUBLICATIONS

Wu, Jim Jian-Xiong, Deng, Li, Chan, Jacky, "Modeling Context-Dependent Phonetic Units in a Continuous Speech Recognition System for Mandarin Chinese", Proc. ICSLP96, 4 pages, Philadelphia, 1996.*

Fu et al., "A Survey on Chinese Speech Recognition," Department of Computer Science, City University of Hong Kong, Nov. 23, 1995.*

Wu et al., Modeling Context-Dependent Phonetic Units in a Continuous Speech Recognition System for Mandarin Chinese, Proc. ICSLP96, 1996, 4 pages, Philadelphia.*

Congxiu et al. ("A New Tone Conversion Method for Mandarin by an Adaptive Linear Prediction Analysis,") Sixth International Conference on Spoken Language Processing, 2000—ISCA).*

Background section of the above-captioned application (previously provided).

Official Action for Taiwanese Patent Application No. 95122293, dated Nov. 4, 2008.

Notification of the First Office Action for Chinese Patent Application No. 200610101996.0, mailed Apr. 3, 2009.

Notification of the Third Office Action (including translation) for Chinese Patent Application No. 200610101996.0, mailed Jan. 22, 2010, pp. 1-5.

Translation of Notification of the Fourth Office Action for Chinese Patent Application No. 200610101996.0, mailed Mar. 29, 2010, pp. 1-2.

Translation of Notification of Second Office Action for Chinese Patent Application No. 200610101996.0, mailed Oct. 23, 2009.

UIQ for Symbian OS v7.0 Demo 3: Entering an SMS with eZiText Chinese, ZI Corporation, 14 pp., printed May 25, 2005 from http://www.zicorp.com/eztextchinesehome.htm, 2005.
UIQ for Symbian OS v7.0 Demo 4: eZiText Chinese in the to Do application, 10 pp., printed May 25, 2005 from http://www.zicorp.com/eztextchinesehome.htm, 2005.
The Chinese Standard for text input, ZI Corporation, 3 pp, printed May 25, 2005 from http://www.zicorp.com/eztextchinesehome.htm, 2005.
Asian Language Terminology, Chinese Writing, 6 pp, printed May 26, 2005 from http://www.aproposinc.com/pages/asiantrm.htm, 1996.
Chinese input by shape, Wubizixing method, 2 pp, printed May 26, 2005 from http://www.honco.net/japanese/05/caption/caption-3-05.html, 2005.
Chinese characters, The history of Chinese characters, 8 pp, printed May 26, 2005 from http://www.blss.portsmouth.sch.uk/hsc/chinchars.shtml, 2005.
How to Read and Type Chinese Characters on Your Computer and Chinese Character Input Methods, 5 pp, printed May 26, 2005 from http://chinese-school.netfirms.com/Chinese-characters.html.
How to Write Chinese Characters, 3 pp, printed May 26, 2005 from http://www.csun.edu/~1151106/stroke.html, 2002.
eZiText Chinese, Introduction, 2 pp., printed Jun. 24, 2005 from http://www.zicorp.com/eztextchinesehome.htm, 2005.
eZiText Chinese, Demo 1, 10 pp., printed Jun. 24, 2005 from http://www.zicorp.com/eztextchinesehome.htm, 2005.
eZiText Chinese, Demo 2, 10 pp., printed Jun. 24, 2005 from http://www.zicorp.com/eztextchinesehome.htm, 2005.
eZiText Chinese, Demo 3, 13 pp., printed Jun. 24, 2005 from http://www.zicorp.com/eztextchinesehome.htm, 2005.
eZiText Chinese, Demo 4, 14 pp., printed Jun. 24, 2005 from http://www.zicorp.com/eztextchinesehome.htm, 2005.
Michaelis, P.R., "Speech Digitization and Compression," International Encyclopedia of Ergonomics and Human Factors, W. Warkowski (Ed.), London: Taylor and Francis, 2001.

* cited by examiner

TONAL CORRECTION OF SPEECH

FIELD

The present invention is directed to the correction of recordings of speech in tonal languages.

BACKGROUND

Languages such as Chinese, Thai, and Vietnamese are unique in that they are tonal languages. In a tonal language, each spoken syllable requires a particular pitch of voice in order to be regarded as intelligible and correct. For example, Mandarin Chinese has four tones, plus a "neutral" pitch. Cantonese Chinese has even more tones. These tones are described as "high, level," high, rising" "low, dipping" and "high, falling" respectively, and may be noted as diacritical marks over Romanized versions of the Chinese sounds.

To mispronounce the tone is to miss the Chinese (or Thai or Vietnamese) word entirely. Therefore, in contrast to the English language, where pitch is used to a limited extent to indicate sentence meaning, for example to denote a question, Chinese uses tone as an integral feature of every word. Because of this, a tonal language spoken by a non-native speaker is often very hard for a native speaker to understand, because the tones are often mispronounced or misapplied.

SUMMARY

In accordance with embodiments of the present invention, a series of words comprising a phrase is analyzed using a speech recognition engine. In particular, the words comprising a phrase create a context in which the component words can be analyzed. From this context, mispronounced words or characters can be identified.

In addition, embodiments of the present invention provide for the correction of mispronounced characters. In particular, modification of recorded speech containing or including a mispronounced character is performed using tonal correction. Tonal correction can be applied before the recorded speech is sent to a recipient mailbox, or otherwise stored in anticipation of later playback. In accordance with further embodiments of the present invention, a user may be prompted to approve corrections before they are applied to the recorded speech.

In accordance with embodiments of the present invention, a database of commonly mispronounced phrases or characters may be referenced in connection with verifying the pronunciation of characters within recorded speech. That is, phrases containing commonly mispronounced characters that, as a result of the mispronunciation have a nonsensical meaning or a meaning that is unlikely to be intended by the speaker, may be mapped to a phrase that is likely the intended phrase. Accordingly, even phrases that include mispronunciations that are in the form of an incorrect application of a common tone can be detected and corrected.

BRIEF DESCRIPTION OF THE DRAWINGS

FIG. 4 depicts example Chinese characters that differ from one another in tone and the Romanized versions of the corresponding sounds indicated by those characters.

DETAILED DESCRIPTION

In accordance with embodiments of the present invention, recorded speech containing one or more mispronunciations can be tonally corrected before that speech is delivered to a recipient mailbox or otherwise stored for later use.

Figure 1:
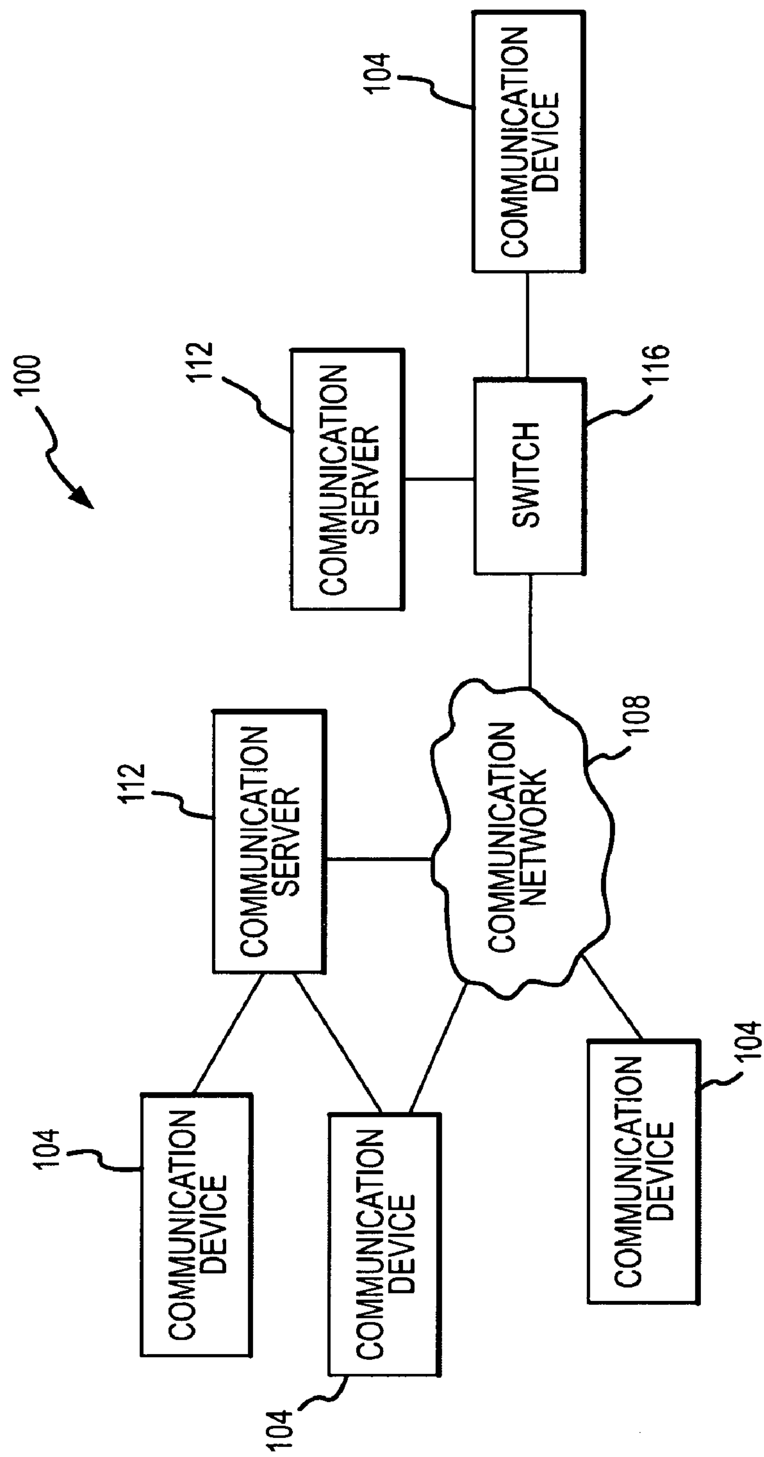
FIG. 1 is a block diagram of a communication system in accordance with embodiments of the present invention.

With reference now to FIG. 1, components of a communication system 100 in connection with embodiments of the present invention are illustrated. In particular, a communication system with a number of communication or computing devices 104 may be interconnected to one another through a communication network 108. In addition, a communication system 100 may include or be associated with one or more communication servers 112 and/or switches 116.

As examples, a communication or computing device 104 may comprise a conventional wireline or wireless telephone, an Internet protocol (IP) telephone, a networked computer, a personal digital assistant (PDA), or any other device capable of transmitting or receiving speech. In accordance with embodiments of the present invention, a communication or computing device 104 may also have the capability of analyzing and recording speech provided by a user for possible tonal correction. Alternatively or in addition, functions such as the analysis and/or storage of speech collected using communication or computing device 104 may be performed by a server 112 or other entity.

A server 112 in accordance with embodiments of the present invention may comprise a communication server or other computer that functions to provide services to client devices. Examples of servers 112 include PBX, voice mail, or servers deployed on a network for the specific purpose of providing tonal correction to speech as described herein. Accordingly, a server 112 may operate to perform communication service and/or connectivity functions. In addition, a server 112 may perform some or all of the processing and/or storage functions in connection with the tonal correction of speech of the present invention.

The communication network 108 may comprise a converged network for transmitting voice and data between associated devices 104 and/or servers 112. Furthermore, it should be appreciated that the communication network 108 need not be limited to any particular type of network. Accordingly, the communication network 108 may comprise a wireline or wireless Ethernet network, the Internet, a private intranet, a private branch exchange (PBX), the public switched telephony network (PSTN), a cellular or other wireless telephony network, or any other network capable of transmitting data, including voice data. In addition, it can be appreciated that the communication network 108 need not be limited to any one network type, and instead may be comprised of a number of different networks and/or network types.

Figure 2:
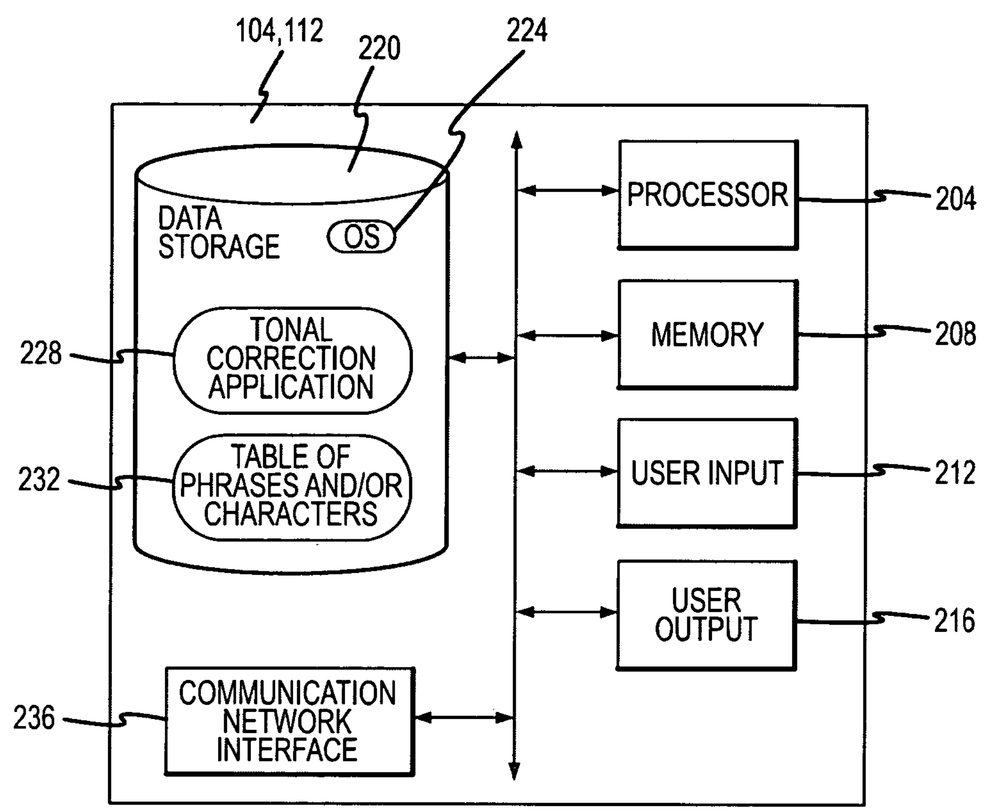
FIG. 2 is a block diagram of components of a communication or computing device or of a server in accordance with embodiments of the present invention.

With reference now to FIG. 2, components of a communications or computing device 104 or of a server 112 implementing some or all of the tonal connection features described herein in accordance with embodiments of the present invention are depicted in block diagram form. The components may include a processor 204 capable of executing program instructions. Accordingly, the processor 204 may include any general purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication device 104 or server 112, including tonal correction operations as described herein.

A communication device 104 or server 112 may additionally include memory 208 for use in connection with the execution of programming by the processor 204 and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, the communication device 104 or server 112 may include one or more user inputs or means for receiving user input 212 and one or more user outputs or means for outputting 216. Examples of user inputs 212 include keyboards, keypads, touch screens, touch pads and microphones. Examples of user outputs 216 include speakers, display screens (including touch screen displays) and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication device 104 or server 112 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

Examples of applications that may be stored in the data storage 220 include a tonal correction application 228. The tonal correction application 228 may incorporate or operate in cooperation with a speech recognition application and/or a text to speech application. In addition, the data storage 220 may contain a table or database of commonly mispronounced phrases and/or characters 232. The table or database 232 may additionally include associations between commonly mispronounced phrases and/or characters and phrases and/or characters that are usually intended. Accordingly, the database 232 may comprise means for storing associations between phrases having similar pronunciations but that include words associated with different tones. As described herein, a tonal correction application 228 and table of phrases or characters 232 may be integrated with one another, and/or operate in cooperation with one another. Furthermore, the tonal correction application may comprise means for comparing received phrases to phrases in the database 232 and means for altering a tone of a word included in a received phrase. The data storage 220 may also contain application programming and data used in connection with the performance of other functions of the communication device 104 or server 112. For example, in connection with a communication device 104 such as a telephone or IP telephone, the data storage may include communication application software. As another example, a communication device 104 such as a personal digital assistant (PDA) or a general purpose computer may include a word processing application in the data storage 220. Furthermore, according to embodiments of the present invention, a voice mail or other application may also be included in the data storage 220.

A communication device 104 or server 112 may also include one or more communication network interfaces 236. Examples of communication network interfaces 236 include a network interface card, a modem, a wireline telephony port, a serial or parallel data port, or other wireline or wireless communication network interface.

Figure 3:
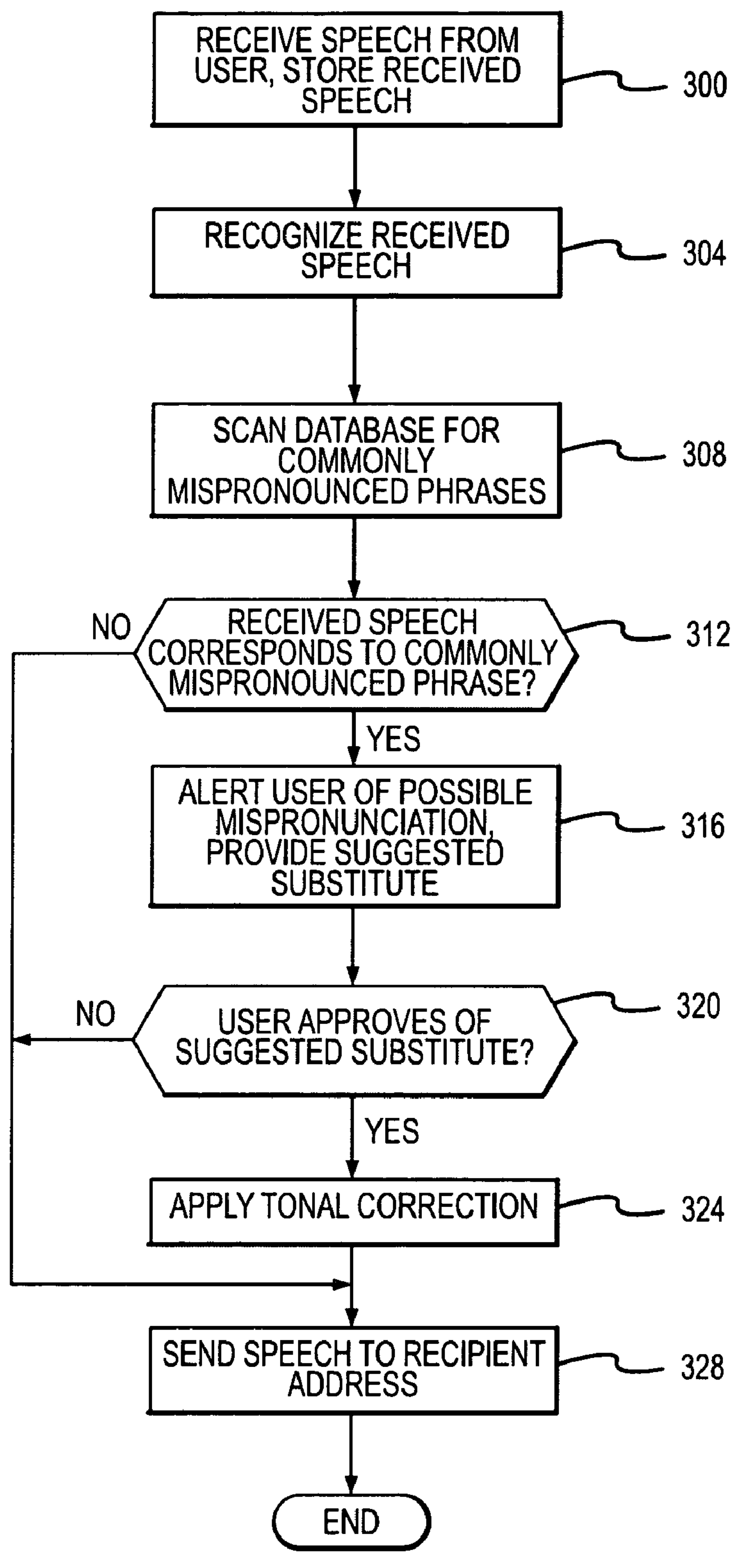
FIG. 3 is a flowchart depicting aspects of a process for the tonal correction of speech in accordance with embodiments of the present invention.

With reference now to FIG. 3, aspects of the operation of a communications device 104 or server 112 providing tonal correction of words or characters in accordance with embodiments of the present invention are illustrated. Initially, at step 300, speech comprising a phrase that includes at least two words is received from the user and is stored, at least temporarily. For example, the received speech may consist of a phrase including a number of words corresponding to a number of Chinese characters that is stored in memory 208 or data storage 220 provided as part of a communication device 104 or server 112. The speech is then recognized, for example, in connection with the operation of a speech recognition application provided as part of a tonal correction application 228 (step 304). That is, the words comprising the phrase pronounced by the user are recognized. The database or table 232 may then be scanned for commonly mispronounced phrases 308. A determination may then be made as to whether the received speech corresponds to a commonly mispronounced phrase (step 312). If the received speech is found to match or otherwise correspond to a commonly mispronounced phrase included in the database 232, the user may be alerted of a possible mispronunciation, and provided with a suggested substitute (step 316). In accordance with embodiments of the present invention, commonly mispronounced phrases are mapped in the database 232 to one or more phrases that may be provided as suggested substitutions. The alert and suggested substitute may be communicated to a user output 216 or a combination of user outputs 216. For example, an alert signal and suggested substitute may be provided to the user as speech output through a speaker at the location of the user. As a further example, an alert signal and/or suggested substitution may be provided to the user through a user output 216 comprising a visual display. Furthermore, some or all of the output comprising a suggested substitute may be in a language that is different than the language of the provided speech containing the mispronounced phrase. For example, the suggested substitute may be communicated to the user in the user's native language, in textual or oral form. As can be appreciated by one of skill in the art after consideration of the present description, oral output may be generated by a text to speech application, engine or function running on a communication or computing device 104 or server 112 that receives text from the tonal correction application 228 and/or database 232.

At step 320, a determination may be made as to whether the user has approved of the suggested substitute. For example, the user may signal assent to a suggested substitute by providing a confirmation signal through a user input 212 device. Such input may be in the form of pressing a designated key, voicing a reference number or other identifier associated with a suggested substitute and/or clicking in an area of the display corresponding to a suggested substitute. Furthermore, assent to a suggested substitution can comprise a selection by a user of one of a number of potential substitutions that have been identified by the tonal correction application 228.

If approval or confirmation of a suggested substitution is received, tonal correction to the user's original speech is applied (step 324). In accordance with embodiments of the present invention, tonal correction may be applied through digital manipulation of the recorded speech. For example, as known to one of skill in the art, speech may be encoded using vocal tract models, such as linear predictive coding. For a general discussion of the operation of vocal tract models, see Speech digitization and compression, by Michaelis, P. R., available in the *International Encyclopedia of Ergonomics and Human Factors*, pp. 683-685, W. Warkowski (Ed.), London: Taylor and Francis, 2001, the entire disclosure of which is hereby incorporated by reference herein. In general, these techniques use mathematical models of the human speech production mechanism. Accordingly, many of the variables in the models actually correspond to the different physical structures within the human vocal tract that vary while a person is speaking. In a typical implementation, the encoding mechanism breaks voice streams into individual short duration frames. The audio content of these frames is analyzed to extract parameters that "control" components of the vocal tract model. The individual variables that are determined by this process include the overall amplitude of the frame and its fundamental pitch. The overall amplitude and fundamental pitch are the components of the model that have the greatest influence on the tonal contours of speech, and are extracted separately from the parameters that govern the spectral filtering, which is what makes the speech understandable and the speaker identifiable. Tonal corrections in accordance with embodiments of the present invention may therefore be performed by applying the appropriate delta to the erroneous amplitude and pitch parameters detected in the speech. Because changes are made to the amplitude and pitch parameters, but not to the spectral filtering parameters, the corrected voice stream will still generally be recognizable as being the original speaker's voice. The corrected speech may then be sent to the recipient address (step 328). For example, where the speech is received in connection with leaving a voice mail message for the recipient, sending the speech may comprise releasing the corrected speech to the recipient address.

If at step 312 it is determined that the received speech does not correspond to a commonly mispronounced phrase, then the speech provided by the user either comprises correctly pronounced words and phrases, or it includes mispronunciations that result in non-sensical or unlikely meanings that are not reflected in the database 232. Accordingly, if the received speech is not found to match one of the commonly mispronounced phrases included in the database 232, the speech is sent to the recipient address at step 328 without having first undergone tonal correction. Likewise, if a user does not approve of a suggested tonal correction, the recorded speech may be sent to the recipient address at step 328 without tonal correction. After a message has been released to a recipient address, the process ends.

In accordance with embodiments of the present invention, various components of a system capable of performing tonal correction of speech can be distributed. For example, a communication device 104 comprising a telephony endpoint may operate to receive speech and command input from a user, and deliver output to the user, but may not perform any processing. According to such an embodiment, processing of received speech to determine whether a match with a commonly mispronounced phrase can be found is performed by a server 112. In accordance with still other embodiments of the present invention, the tonal correction functions may be performed entirely within a single device. For example, a communication device 104 with suitable processing power may analyze the speech, suggest correction, and apply approved correction. According to these other embodiments, when the communication device 104 releases the speech to the recipient, that speech may be delivered to, for example, the recipients answering machine or to a voice mailbox associated with a server 112.

Figure 4:
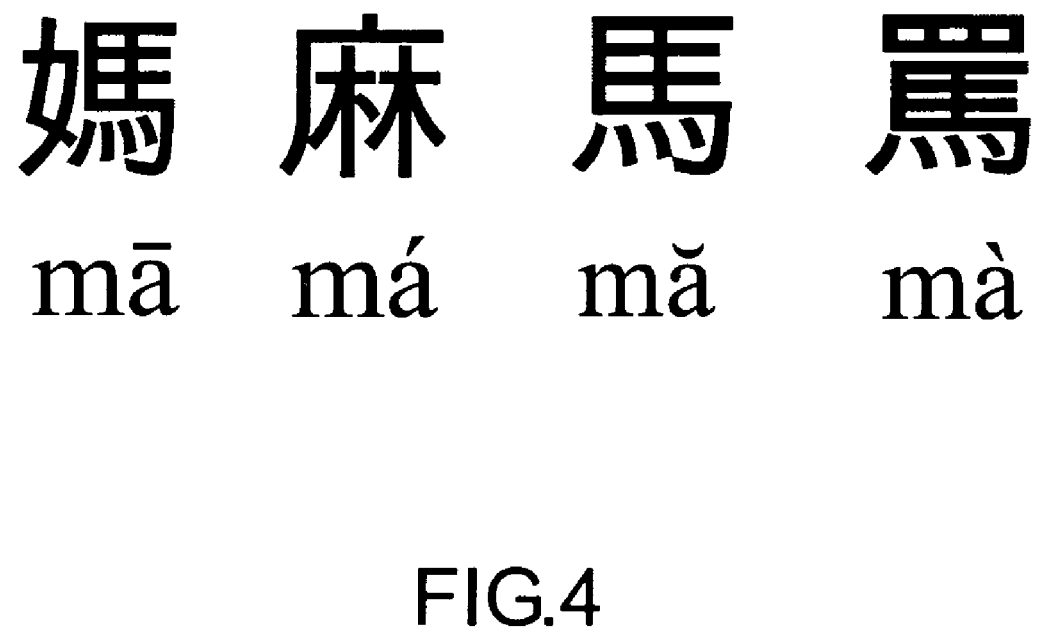

To further illustrate operation of embodiments of the present invention, and with reference now to FIG. 4, four different Chinese characters and the Romanized versions of the corresponding Chinese sounds are illustrated. These characters are the Mandarin Chinese equivalents of the words "mother" "sesame" "horse" and "to scold." Furthermore, the character corresponding to "mother" is pronounced with a high, level tone; the character corresponding to the word "sesame" is pronounced with a high, rising tone; the character corresponding to the word "horse" is pronounced with a low, dipping tone; and the character corresponding to "to scold" is pronounced with a high, falling tone. Because of the subtle differences, at least to non-native Chinese speakers, between the pronunciations of these four characters, mispronunciations between them are common. However, even if the speech input by a user applies an incorrect tone, or a particular tone cannot be identified, the intended meaning can be inferred from the context in which it is applied. Accordingly, the database 332 may contain the phrases: ride scold; ride sesame; and ride mother. Each of these phrases is mapped by the database 332 to the correct phrase "ride horse." The phrase "ride horse" may then be suggested to the user. If accepted, the speech provided by the user is corrected so that the word "horse" (pronounced roughly as "ma") has the correct low, dipping tone. By recognizing provided speech comprising a phrase and scanning a database for the recognized phrase, the meaning (and therefore the pronunciation) likely intended by the user can be identified.

In accordance with embodiments of the present invention, tonal correction as described herein may be applied in connection with real-time, near real-time, or off-line applications, depending on the processing power and other capabilities of communication devices 104 and/or servers 112 used in connection with the application of the tonal correction functions. In addition, although certain examples described herein have related to voice mail applications, embodiments of the present invention are not so limited. For instance, tonal corrections as described herein can be applied to any recorded speech and even speech delivered to a recipient at close to real time. Furthermore, although certain examples provided herein have discussed the use of tonal correction in connection with the Chinese language, it can be applied to other tonal languages, such as Thai and Vietnamese.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for correction of recorded speech, comprising:

a communication device receiving a speech from a user, wherein the received speech includes at least two words;

a processor identifying at least a first received phrase in the received speech, wherein the identifying includes recognizing the at least two words of the first received phrase;

the processor comparing the first received phrase to a plurality of stored phrases, wherein the comparing includes scanning the plurality of stored phrases to match the first received phrase to a phrase included in the plurality of stored phrases, wherein the plurality stored phrases includes commonly mispronounced phrases, and wherein each of the commonly mispronounced phrases is mapped to at least one suggested phrase that includes at least two words, wherein the meanings of the commonly mispronounced phrases and of the at least one suggested phrase in each mapped pair is different;

the processor matching the first received phrase to at least a first one of the plurality of stored phrases comprising a commonly mispronounced phrase;

the processor determining from the matching that a second one of the plurality of stored phrases is likely an intended phrase based on likelihood of mispronunciation of the stored phrase, wherein the first one of the plurality of stored phrases is a commonly mispronounced phrase that is mapped to the second one of the plurality of stored phrases;

the processor suggesting by the communication device the second one of the plurality of stored phrases to the user as a first suggested substitute phrase, wherein a first word of the two words of the first received phrase is included in the first suggested substitute phrase, wherein a second word of the two words of the first received phrase is not included in the first suggested substitute phrase, wherein the first suggested substitute phrase is not provided to the user prior to the receiving speech from the user at the communication device; and the processor automatically altering the first received phrase to correspond to the first suggested substitute phrase, wherein in automatically altering the first received phrase the processor corrects a tonal characteristic of at least a portion of the first received phrase.

2. The method of claim 1, further comprising:

receiving a confirmation signal from the user indicating that the second one of the plurality of stored phrases is the intended phrase;

in response to receiving the confirmation signal, altering the first received phrase to correspond to the second one of the plurality of stored phrases.

3. The method of claim 2, wherein the first received phrase is encoded using a vocal tract model comprising linear predictive coding.

4. The method of claim 2, wherein the altering the first received phrase comprises changing at least one of an amplitude and a pitch parameter of at least a portion of the first received phrase.

5. The method of claim 4, wherein spectral filtering parameters of the at least a portion of the first received phrase are not changed by the altering.

6. The method of claim 2, further comprising:

after the altering the first received phrase, releasing the first received phrase for delivery to a recipient mailbox.

7. The method of claim 2, wherein the altering the first received phrase includes changing a tone associated with at least one word of the first received phrase.

8. The method of claim 1, wherein the first received phrase and the second one of the plurality of stored phrases differ from one another in that a word of the first received phrase and a word of the second one of the plurality of stored phrases are associated with a different tone.

9. The method of claim 1, further comprising:

suggesting a number of the stored phrases to the user, wherein the number of stored phrases includes the second one of the plurality of stored phrases.

10. The method of claim 1, wherein the speech received from the user first received phrase is in a first language, and wherein the suggested second one of the plurality of stored phrases is presented to the user in a second language.

11. The method of claim 10, wherein the second one of the plurality of stored phrases is presented to the user by a text to speech application.

12. The method of claim 1, wherein a word included in the first received phrase is pronounced such that a tone associated with the pronunciation is indeterminate, and wherein the matching the first received phrase to at least a first one of the plurality of stored phrases comprises identifying at least a first one of the plurality of stored phrases that include the word associated with a first tone.

13. The method of claim 12, wherein the matching further comprises identifying a second one of the plurality of stored phrases that include the word associated with a second tone.

14. A system for the tonal correction of speech, comprising:

a user input, operable to receive speech;

a memory, wherein the memory contains a database of stored phrases, wherein the database of stored phrases includes commonly mispronounced phrases that are mapped to suggested substitute phrases;

a processor in communication with the user input and the memory, wherein in response to receipt of speech from a user from the user input, and wherein the speech comprises at least a first received phrase that includes at least two words, the processor operable to:

compare the first received phrase to at least a first stored phrase included in the database of stored phrases;

match the first received phrase to the first stored phrase, wherein the first stored phrase is mapped to a first suggested phrase; and alter a first word in the first received phrase to match a second word in the first suggested phrase, wherein after altering the first word the first suggested phrase is identical to the first received phrase, wherein the alteration of a tone of the first word forms the second word that is different than the first word, wherein the first stored phrase is not provided to the user by the system prior to the receipt of speech by the system, and wherein the second word is output by the system.

15. The system of claim 14, wherein the first received phrase is digitized according to a vocal tract model, and wherein the alteration of a tone of the first word included in the first received phrase includes changing at least one of an amplitude and a pitch parameter of the first word.

16. The system of claim 14, further comprising:

a communication interface interconnected to the processor;

a communication network interconnected to the communication interface and to a plurality of addresses, wherein an altered first phrase is released for delivery to a recipient address.

17. The system of claim 16, further comprising:

a user output, wherein the first altered phrase has a meaning corresponding to the first suggested phrase, and wherein the first suggested phrase is presented to the user through the user output for approval, and wherein in response to confirmation from the user that the first suggested phrase is approved the first altered phrase is formed and is released for delivery to the recipient address.

18. The system of claim 17, wherein the user output includes a speaker, and wherein the first suggested phrase is presented to the user as speech.

19. The system of claim 16, further comprising:

a user output, wherein the first stored phrase is mapped to a number of suggested phrases, wherein the number of suggested phrases are presented to the user through the user output, wherein in response to user input comprising a selection of one of the suggested phrases the first altered phrase is formed, and wherein the first altered phrase corresponds to the selected one of the suggested phrases.

20. The system of claim 17, wherein the speech comprising at least a first received phrase is in a first language and wherein the first suggested phrase is presented to the user in a second language.

21. A system for correcting tonal speech, comprising:

means for receiving speech as input;

means for storing, wherein a plurality of stored phrases are stored in the means for storing, wherein the plurality of stored phrases include a plurality of commonly mispronounced phrases, wherein each commonly mispronounced phrase is mapped to a suggested substitute phrase, wherein each phrase includes at least two words;

means for comparing a first received phrase included in input speech to phrases included in the means for storing, wherein the first received phrase is matched to a first commonly mispronounced phrase included in the plurality of stored phrases, and wherein the first commonly mispronounced phrase is mapped to a first suggested substitute phrase;

means for altering a tone of at least a first word included in the first received phrase without further input by a user, wherein a meaning of the first received phrase is changed to correspond to a meaning of an associated phrase comprising the first suggested substitute phrase, wherein the first suggested substitute phrase is not provided to the user prior to receiving the first received phrase from the user, and wherein the first suggested substitute phrase is output.

22. The system of claim 21, further comprising:

means for outputting at least the first suggested substitute phrase to the user.

23. The system of claim 22, wherein altering a tone of at least at first word in the first received phrase creates an altered first received phrase, the system further comprising:

means for delivering the altered first received phrase to a recipient address in response to input from the user approving of the altered first received phrase.

24. The method of claim 1, wherein the second word of the first received phrase differs only in tone from a second word of the first suggested substitute phrase, and wherein the first received phrase is non-sensical.

* * * * *

UNITED STATES PATENT AND TRADEMARK OFFICE

CERTIFICATE OF CORRECTION

PATENT NO. : 8,249,873 B2
APPLICATION NO. : 11/203463
DATED : August 21, 2012
INVENTOR(S) : Colin Blair et al.

It is certified that error appears in the above-identified patent and that said Letters Patent is hereby corrected as shown below:

At Column 10, line 17, please delete "at" and replace it with --a-- therein.

Signed and Sealed this
Nineteenth Day of February, 2013

Teresa Stanek Rea
*Acting Director of the United States Patent and Trademark Office*